Aug. 10, 1926.

I. D. KRAMER ET AL

BRACE

Filed July 21, 1925

1,595,952

Inventor
Isaac D. Kramer
Morton L. Bissell
By Watson E. Coleman
Attorney

Patented Aug. 10, 1926.

1,595,952

UNITED STATES PATENT OFFICE.

ISAAC D. KRAMER AND MORTON L. BISSELL, OF SEATTLE, WASHINGTON, ASSIGNORS TO KRAMER-BISSELL COMPANY, INC., OF SEATTLE, WASHINGTON, A CORPORATION OF WASHINGTON.

BRACE.

Application filed July 21, 1925. Serial No. 45,055.

This invention relates to certain improvements in braces and has relation more particularly to a device of this kind especially designed and adapted for use in connection with stepladders, and it is an object of the invention to provide a brace of this kind which serves to effectively reinforce the connection between the tread of a ladder and a side member.

Another object of the invention is to provide a device of this general character formed from a single sheet of material adapted to be attached to the adjacent edges of a tread and side member together with lugs struck therefrom and having close contact with said tread and side member.

The invention consists in the details of construction and in the combination and arrangement of the several parts of our improved brace whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1:
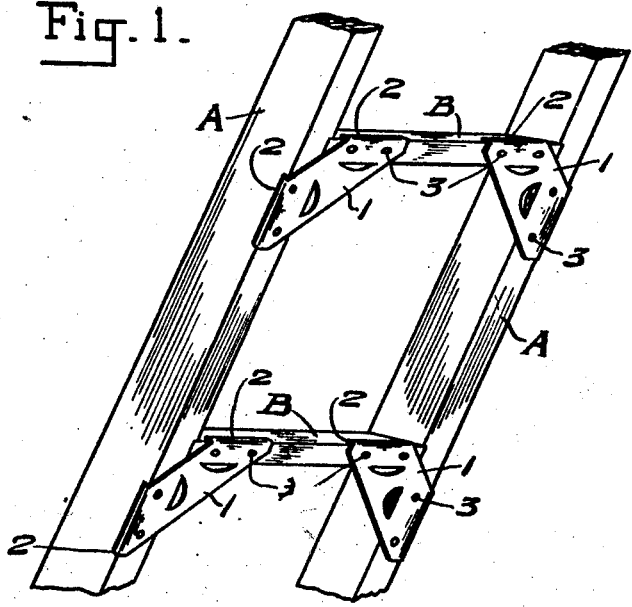
Figure 1 is a fragmentary view in perspective of a stepladder illustrating braces constructed in accordance with an embodiment of our invention applied thereto.
Figure 2:
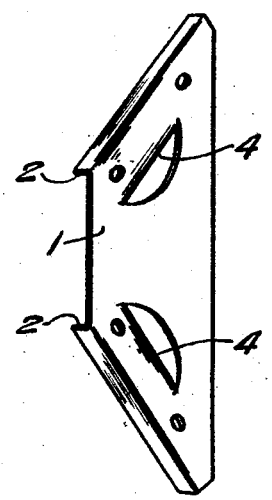
Figure 2 is a view in perspective of one of our improved braces as herein set forth.
Figure 3:
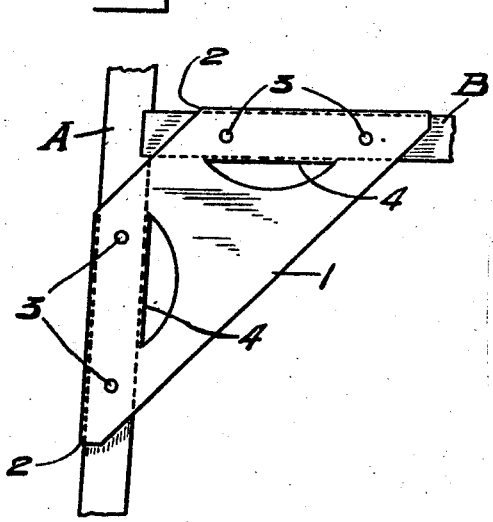
Figure 3 is a fragmentary view in rear elevation of one of our improved braces in applied position.
Figure 4:
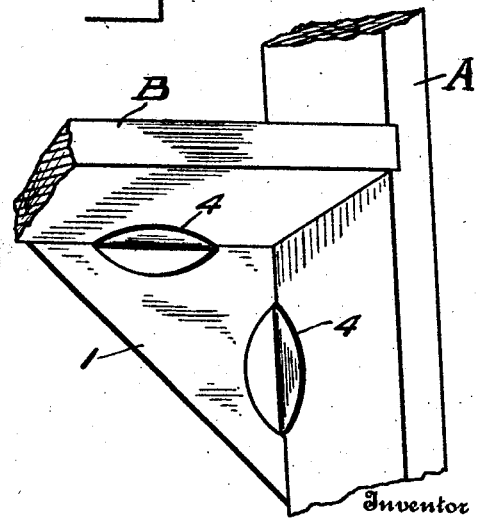
Figure 4 is a fragmentary view in perspective taken from the front illustrating one of our improved braces applied.

As disclosed in the accompanying drawings, A denotes the side member of a stepladder with which is engaged in a conventional manner an end portion of a tread or step B.

Our improved brace comprises a plate 1 adapted to have its end portions secured to the rear edges of the side member A and tread B adjacent to their point of connection, the end edges of the plate 1 being arranged on requisite angles to conform to the outer face of the side member A and the upper face of the tread or step B, said edges being defined by the forwardly disposed flanges 2 overlying said faces and in close contact therewith. The plate may be held in applied position by suitable retaining members 3, such as screws or nails.

The opposite end portions of the plate 1 have struck outwardly therefrom lugs 4 in such angular relation as to have one of said lugs in close contact with the inner face of the side member A and the second lug in close contact from below with the tread or step B.

By the use of braces constructed in accordance with our invention the treads or steps are effectively held against displacement with respect to the side members whereby is provided a ladder structure possessing maximum of strength.

From the foregoing description it is thought to be obvious that a brace constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

In combination with the side member and tread of a ladder, a brace therefor comprising a plate overlying adjacent edges of the tread and side member, the end edges of the plate being arranged on angles to conform to the outer face of the side member and the upper face of the tread member, said edges being defined by forwardly disposed flanges overlying said faces and in close contact therewith, outstanding lugs struck from the plate and disposed in the same general direction as the flanges, said lugs having close contact with the inner face of the side member and the under face of the tread, and means coacting with the opposite end portions of the plate between the lugs and flanges for securing said plate to the side member and tread.

In testimony whereof we hereunto affix our signatures.

ISAAC D. KRAMER.
MORTON L. BISSELL.